United States Patent
Miyaishi

(10) Patent No.: US 10,941,077 B2
(45) Date of Patent: Mar. 9, 2021

(54) METHOD FOR PRODUCING ALUMINA SINTERED BODY

(71) Applicant: SHOWA DENKO K.K., Tokyo (JP)

(72) Inventor: So Miyaishi, Kawasaki (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/647,338

(22) PCT Filed: Dec. 19, 2018

(86) PCT No.: PCT/JP2018/047990
§ 371 (c)(1),
(2) Date: Mar. 13, 2020

(87) PCT Pub. No.: WO2019/131818
PCT Pub. Date: Jul. 4, 2019

(65) Prior Publication Data
US 2020/0392044 A1    Dec. 17, 2020

(30) Foreign Application Priority Data
Dec. 25, 2017  (JP) .............................. JP2017-248431

(51) Int. Cl.
*C04B 35/10* (2006.01)
*C04B 35/111* (2006.01)
(Continued)

(52) U.S. Cl.
CPC .......... *C04B 35/10* (2013.01); *C04B 35/6325* (2013.01); *C04B 35/64* (2013.01);
(Continued)

(58) Field of Classification Search
CPC ...... C04B 35/10; C04B 35/111; C04B 35/115
See application file for complete search history.

(56) References Cited

U.S. PATENT DOCUMENTS 5,645,618 A   7/1997  Monroe et al.
5,651,801 A   7/1997  Monroe et al.
(Continued)

FOREIGN PATENT DOCUMENTS

CN        1134692 A    10/1996
CN      104350025 A     2/2015
(Continued)

OTHER PUBLICATIONS

T. Koyama et al., "Effect of a small amount of liquid-forming additives on the microstructure of $Al_2O_3$ ceramics", Journal of Materials Science, 1993, pp. 5953-5956, vol. 28.
(Continued)

*Primary Examiner* — Karl E Group
(74) *Attorney, Agent, or Firm* — Sughrue Mion, PLLC

(57) ABSTRACT

A method for producing an alumina sintered body, including: a step of applying an alkaline earth metal compound onto a surface of an alumina raw material which is an unsintered alumina compact or an alumina sintered body; and a step of subjecting the alumina raw material to which the alkaline earth metal compound has been applied to heat treatment at a temperature of 1200° C. or more for 5 minutes or more and 300 minutes or less.

5 Claims, 5 Drawing Sheets

(51) Int. Cl.
*C04B 35/632* (2006.01)
*C04B 35/64* (2006.01)

(52) U.S. Cl.
CPC ............ *C04B 2235/3208* (2013.01); *C04B 2235/3215* (2013.01); *C04B 2235/3217* (2013.01); *C04B 2235/48* (2013.01); *C04B 2235/656* (2013.01); *C04B 2235/728* (2013.01)

(56) References Cited

U.S. PATENT DOCUMENTS

| | | | |
|---|---|---|---|
| 10,710,213 B2* | 7/2020 | Miyaishi | B24D 3/14 |
| 2013/0337725 A1 | 12/2013 | Monroe | |
| 2020/0001432 A1* | 1/2020 | Miyaishi | B24D 3/14 |

FOREIGN PATENT DOCUMENTS

| | | |
|---|---|---|
| JP | 09-87008 A | 3/1997 |
| JP | 2001-322865 A | 11/2001 |
| JP | 2004-26513 A | 1/2004 |
| JP | 2004-307239 A | 11/2004 |
| JP | 2009-102181 A | 5/2009 |

OTHER PUBLICATIONS

International Search Report for PCT/JP2018/047990 dated Mar. 27, 2019 [PCT/ISA/210].
Written Opinion of the International Searching Authority for PCT/JP2018/047990 dated Mar. 27, 2019 [PCT/ISA/237].
International Preliminary Report on Patentability for PCT/JP2018/047990 dated Jan. 7, 2020 [PCT/IPEA/409].

* cited by examiner

[Fig. 1]
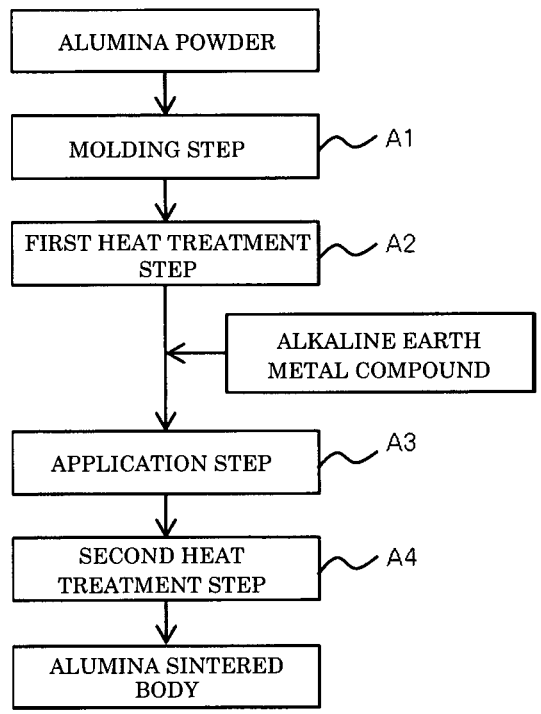
[Fig. 2]
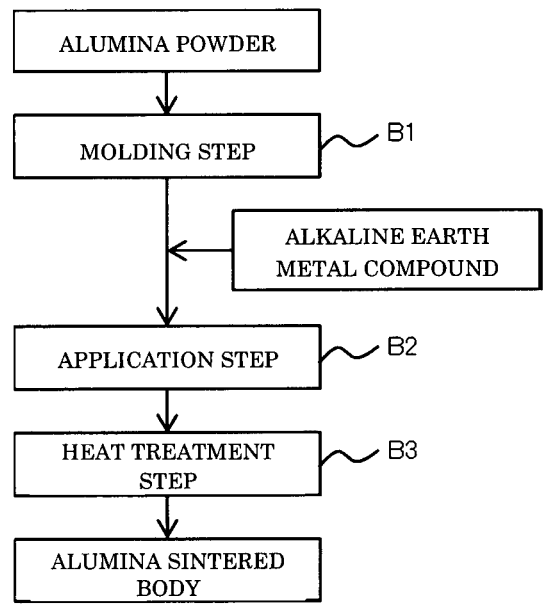

[Fig. 3]
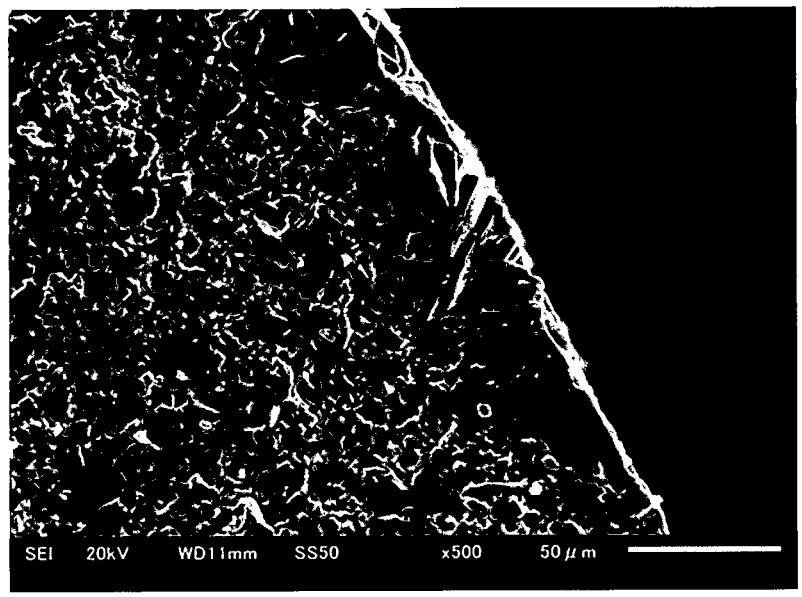
[Fig. 4]
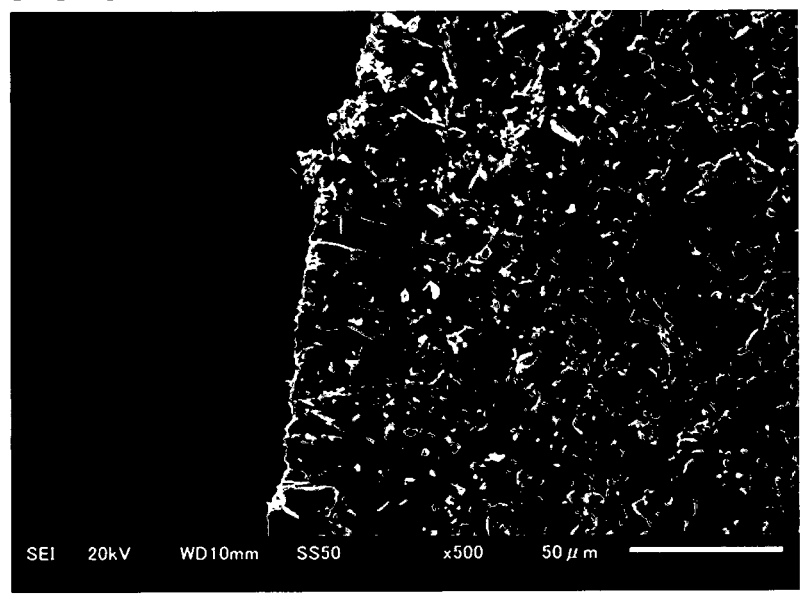

[Fig. 5]
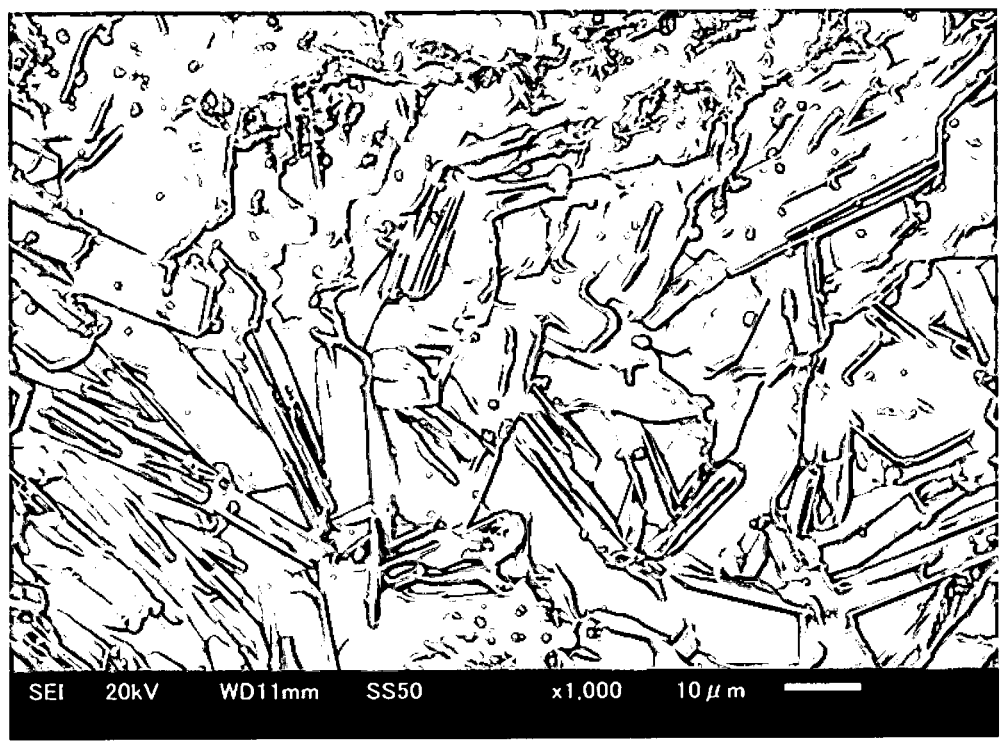
[Fig. 6]
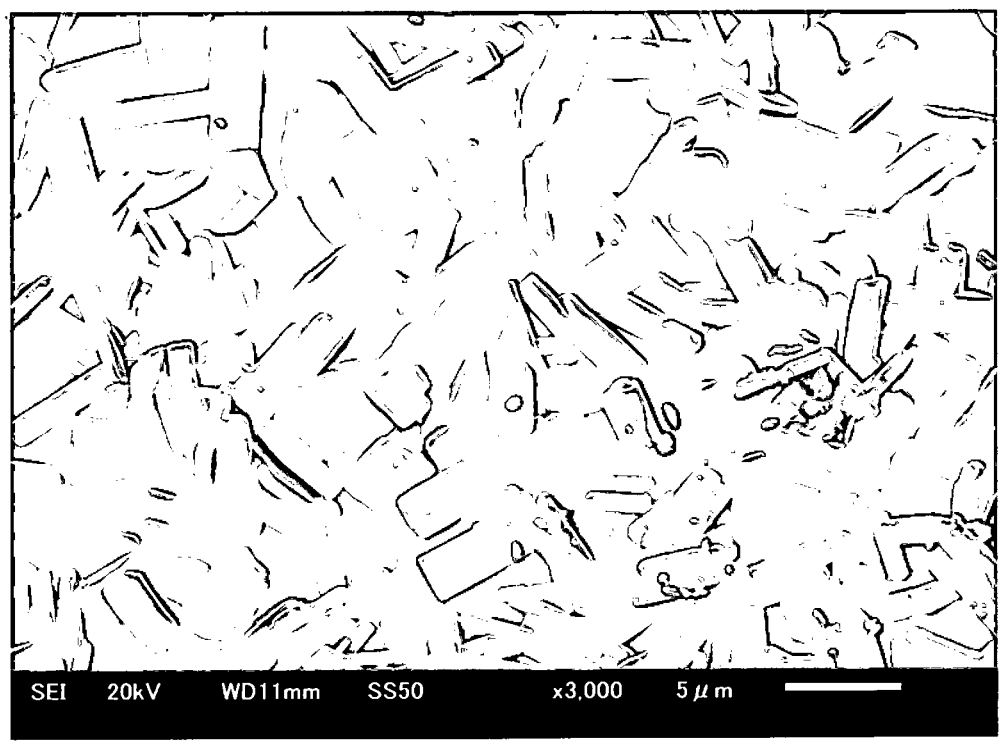

[Fig. 7]
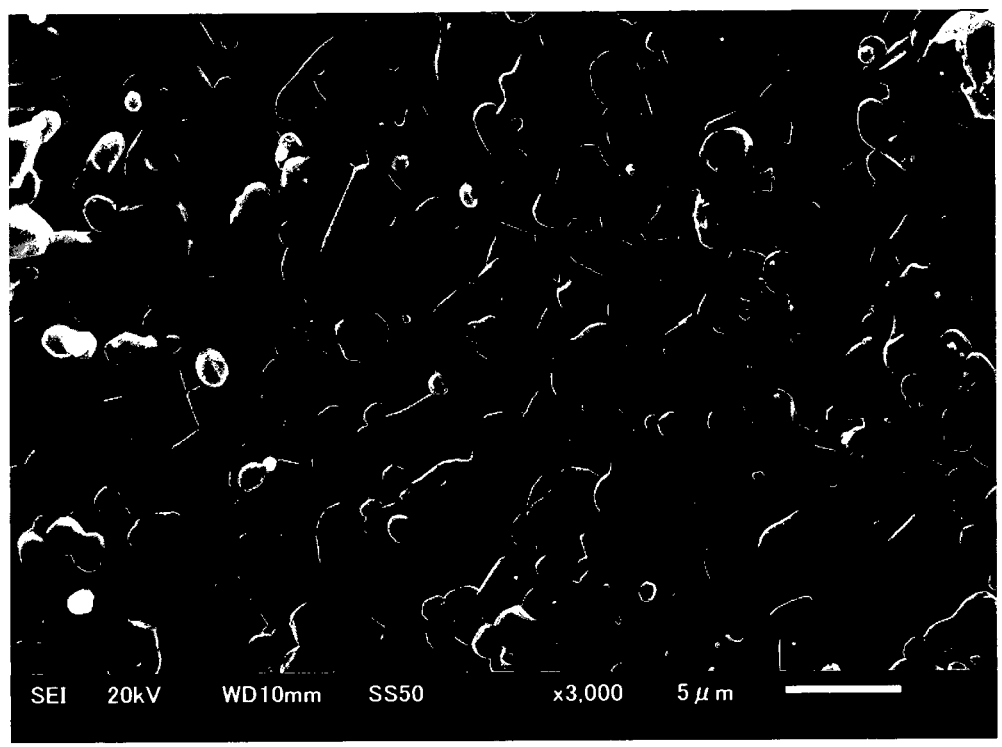
[Fig. 8]
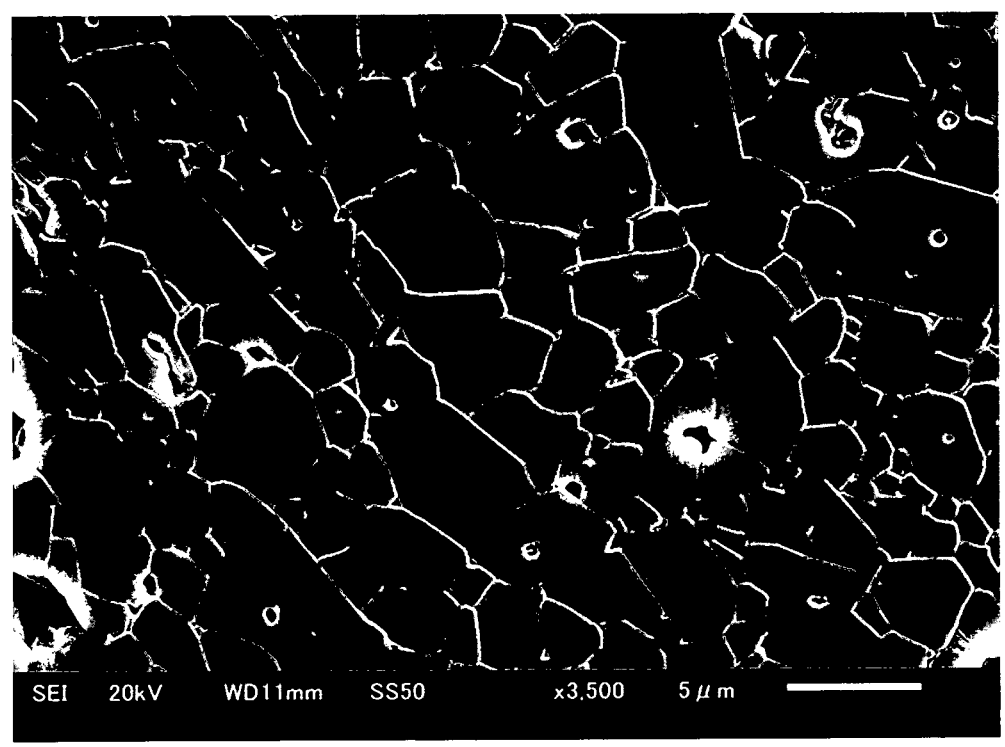

[Fig. 9]
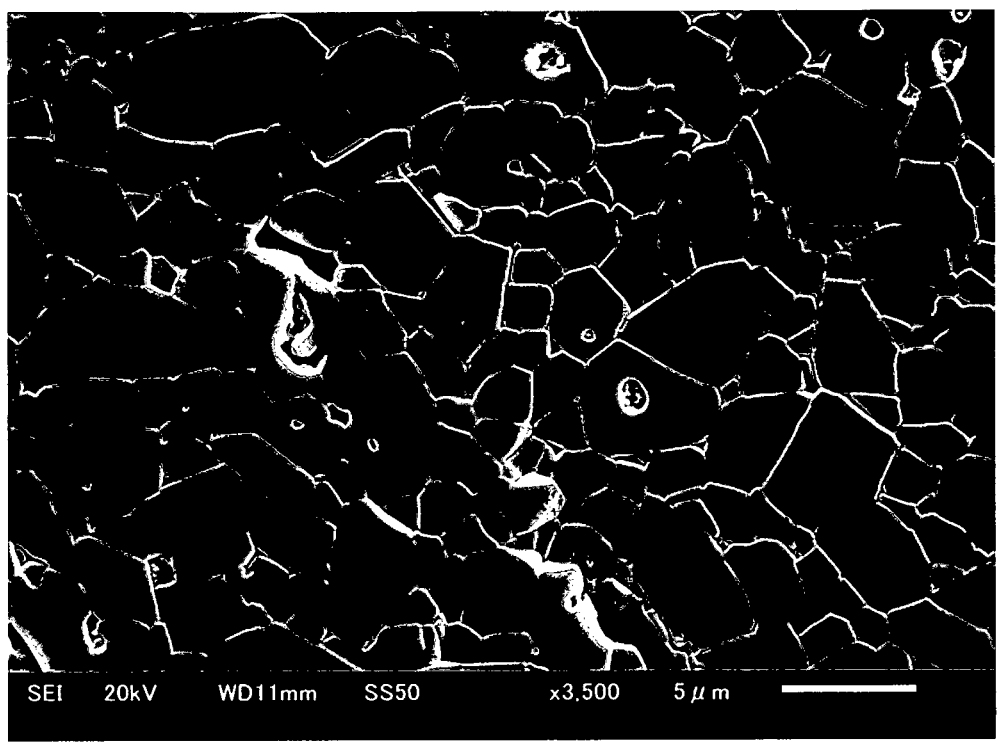

METHOD FOR PRODUCING ALUMINA SINTERED BODY

CROSS REFERENCE TO RELATED APPLICATIONS

This application is a National Stage of International Application No. PCT/JP2018/047990, filed Dec. 19, 2018, claiming priority based on Japanese Patent Application No. 2017-248431, filed Dec. 25, 2017.

TECHNICAL FIELD

The present invention relates to a method for producing an alumina sintered body, particularly to a method for producing an alumina sintered body using an alkaline earth metal compound.

BACKGROUND ART

Alumina sintered bodies have been used in various industrial fields, making use of the feature of having excellent properties such as high hardness, high strength, high heat resistance, high wear resistance, and high chemical resistance. As one of such applications of alumina sintered bodies, a grinding wheel is mentioned.

Special alloys are often used as materials for parts constituting transportation equipment typified by automobiles or industrial machines. Since such special alloys are harder than normal SUS304 or the like, heavy-grinding wheels having a high "grinding ratio" which have not existed in the past are required in the market for processing these alloys. Here, the "grinding ratio" is an indicator showing the performance of grinding wheels and is represented by the following formula. A higher grinding ratio indicates higher performance of grinding wheels.

Grinding ratio=Amount of work materials ground (grinding amount)/Wear amount of grinding wheel ($A$)

Generally, if many work materials can be ground with few grinding wheels, the performance is determined to be good, but the grinding ratio of a grinding wheel is affected by the hardness, the strength, and the toughness of abrasive grains used for the grinding wheel. Further, phenolic resins and the like are mainly used as binders, and therefore the abrasive grains are required also to have resin affinity. The following relationships are considered to exist between the grinding ratio and the hardness, between the grinding ratio and the strength or the toughness, and between the grinding ratio and the resin affinity:
(1) As the hardness of abrasive grains increase, the grinding amount also increases, and therefore the grinding ratio also increases;
(2) As the strength or the toughness increases, the amount of abrasive grains broken decreases, and therefore the grinding ratio increases; and
(3) As the resin affinity of abrasive grains increases, shedding of the abrasive grains from grinding wheels hardly occurs, and therefore the grinding ratio increases.

That is, the numerator in the formula of the grinding ratio is affected by the hardness of abrasive grains, and the denominator therein is affected by the strength or the toughness and the resin affinity of abrasive grains. In order to obtain a grinding wheel with a large grinding ratio, it is ideal to increase all of the hardness, the strength, the toughness, and the resin affinity.

For example, Patent Literature 1 discloses allowing a fine isotropic crystal and a crystal having an anisotropic shape to coexist by mixing a metal oxide having a eutectic point with $Al_2O_3$ of 1600° C. or less with $Al_2O_3$ powder, followed by firing using microwaves.

Further, Non Patent Literature 1 discloses that CaO and $SiO_2$ are uniformly co-doped in an alumina raw material in order to allow a plate-shaped alumina crystal having a large anisotropy to be contained in an alumina sintered body.

Further, Patent Literature 2 discloses layering an aluminum oxide material containing a crystal growth inhibitor and an aluminum oxide material containing a crystal growth promoter, followed by sintering the obtained laminate in one step.

Further, Patent Literature 3 discloses applying a solution or a slurry containing a magnesium compound to an aluminum oxide compact or a pre-sintered body, followed by main sintering. Patent Literature 3 discloses that a multilayer aluminum oxide sintered body in which the surface layer is composed of an equiaxed crystal with a small grain size, and the inside is composed of an anisotropic crystal can be obtained according to this production method.

Further, Patent Literature 4 discloses a multilayer alumina sintered body having an internal layer and a surface layer that contains silicon on the surface and has the same constituent crystalline phase as the internal layer, with their average crystal grain sizes being different from each other by 30% or more.

CITATION LIST

Patent Literature

PTL1: JP 09-87008 A
PTL2: JP 2004-26513 A
PTL3: JP 2004-307239 A
PTL4: JP 2009-102181 A

Non Patent Literature

NPTL1: J. Mat. Sci., 28 (1993) 5953-56

SUMMARY OF INVENTION

Technical Problem

In the disclosure according to Patent Literature 1, TiO and MgO need to be solid-dissolved in the entire alumina crystal, and therefore the hardness of the alumina sintered body decreases. Further, the fine isotropic crystal and the crystal having an anisotropic shape coexist in both the surface and the inside of the sintered body, and therefore when required physical properties are different between the surface and the inside of the sintered body, it is difficult to obtain the desired performance only by controlling the ratio of the fine isotropic crystal and the crystal having an anisotropic shape.

When an aid to produce a liquid phase is uniformly added during sintering, as in Non Patent Literature 1, the aid remains in the grain boundary of the alumina sintered body, and the hardness and the strength at high temperature considerably decrease.

Since powder is layered in the production method according to Patent Literature 2, a sufficient two-layer structure cannot be obtained unless the thickness of the surface layer is 1 mm or more, and thus it is difficult to produce molded articles that are as small as used for abrasive grains.

In the production method according to Patent Literature 3, main sintering is performed after the magnesium compound is deposited on the aluminum oxide pre-sintered body, but there is room for further improvement in wear resistance of the alumina sintered body obtained by this production method, as in Comparative Example 3, which will be described below.

In the multilayer alumina sintered body according to Patent Literature 4, the hardness of the surface of the sintered body decreases due to silicon present on the surface of the sintered body.

Therefore, it is an object of the present invention to provide a method for producing an alumina sintered body having high hardness and excellent wear resistance.

Solution to Problem

In order to achieve the aforementioned object, the present invention has any one of configurations [1] to [8]:

[1] A method for producing an alumina sintered body, comprising: a step of applying an alkaline earth metal compound onto a surface of an alumina raw material comprising an unsintered alumina compact or an alumina sintered body; and a step of subjecting the alumina raw material to which the alkaline earth metal compound has been applied to heat treatment at a temperature of 1200° C. or more for 5 minutes or more and 300 minutes or less;

[2] The method for producing an alumina sintered body according to [1], wherein the alkaline earth metal compound is applied to the alumina raw material as a solution or a dispersion comprising the alkaline earth metal compound;

[3] The method for producing an alumina sintered body according to [1] or [2], wherein the alkaline earth metal compound is applied in an amount of 0.05 parts by mass or more and 5.0 parts by mass or less, in terms of oxide, per 100 parts by mass of the alumina raw material;

[4] The method for producing an alumina sintered body according to any one of [1] to [3], wherein the heat treatment is performed at 1800° C. or less;

[5] The method for producing an alumina sintered body according to any one of [1] to [4], wherein the alumina raw material is an alumina sintered body obtained by molding alumina powder with a median diameter ($d_{50}$) of 3 μm or less, followed by heat treatment at a heat treatment temperature of 1200° C. or more;

[6] The method for producing an alumina sintered body according to any one of [1] to [4], wherein the alumina raw material is an unsintered alumina compact;

[7] The method for producing an alumina sintered body according to [6], wherein the unsintered alumina compact is obtained by molding alumina powder with a median diameter (do) of 3 μm or less as a raw material; and

[8] The method for producing an alumina sintered body according to any one of [1] to [7], wherein the alumina raw material is free from silicon except unavoidable impurities, and the method does not comprise a step of adding silicon or a compound comprising silicon.

Advantageous Effect of Invention

The present invention can provide a method for producing an alumina sintered body having high hardness and excellent wear resistance.

BRIEF DESCRIPTION OF DRAWINGS

FIG. 1 is a flowchart showing an example of a method for producing an alumina sintered body of a first embodiment of the present invention.

FIG. 2 is a flowchart showing an example of a method for producing an alumina sintered body of a second embodiment of the present invention.

FIG. 3 is a scanning electron microscope (SEM) image (500 times) of a cross section of an alumina sintered body of Example 1.

FIG. 4 is a scanning electron microscope (SEM) image (500 times) of a cross section of an alumina sintered body of Example 4.

FIG. 5 is a scanning electron microscope (SEM) image (1000 times) of a surface of an alumina sintered body of Example 2.

FIG. 6 is a scanning electron microscope (SEM) image (3000 times) of a surface of the alumina sintered body of Example 4.

FIG. 7 is a scanning electron microscope (SEM) image (3000 times) of a surface of an alumina sintered body of Comparative Example 1.

FIG. 8 is a thermally etched image (3500 times) of an inner layer of the alumina sintered body of Example 2 observed by SEM.

FIG. 9 is a thermally etched image (3500 times) of an inner layer of the alumina sintered body of Example 4 observed by SEM.

DESCRIPTION OF EMBODIMENTS

Hereinafter, embodiments of the present invention will be described in detail, but the present invention is not limited to the following embodiments. In the following description, the phrase "A to B" referring to a numerical range indicates a numerical range including A and B that are the end points. That is, it means a numerical range of "A or more and B or less" (in the case of A<B) or "A or less and B or more" (in the case of A>B).

In the following description, "alkaline earth metals" mean calcium, strontium, and barium. Further, the description of element names such as calcium, strontium, and barium collectively refers to such elements contained in a single substance, a compound, or a mixture, unless otherwise described.

The "content (mass %)" of a target component is a numerical value indicating the amount of the target component as a percentage based on the total amount of a plurality of components including the target component. The amount or the content of the target component in terms of oxide means the amount or the content when each target component is converted into an oxide (such as CaO, SrO, and BaO having an oxidation number of 2 in the case of alkaline earth metals).

The "average aspect ratio" is an average value of aspect ratios based on the number. The average aspect ratio is obtained by observing the surface of an alumina sintered body by a scanning electron microscope to measure the lengths of the long axis and the short axis of each of a specific number (specific examples of the number will be described in Examples) of alumina crystal grains selected at random so as to calculate their aspect ratios, and calculating an average value thereof. Further, the "median diameter ($d_{50}$)" means a 50% grain size in a volume-based cumulative grain size distribution measured using a laser diffraction particle size analyzer.

Further, the alumina sintered body before the alkaline earth metal compound is applied (in the application step A3, which will be described below) in the first embodiment and the alumina compact (unsintered alumina compact) before the alkaline earth metal compound is applied (in the application step B2, which will be described below) in the second embodiment are collectively referred to as "alumina raw materials".

1. First Embodiment

FIG. 1 is a flowchart showing an example of a method for producing an alumina sintered body of the first embodiment of the present invention. This production method includes a molding step A1 of fabricating an alumina compact from alumina powder, a first heat treatment step A2 of subjecting the alumina compact obtained in the molding step A1 to heat treatment, an application step A3 of applying an alkaline earth metal compound to the surface of the alumina sintered body obtained in the first heat treatment step A2 (which will be hereinafter referred to as an alumina sintered body raw material so as to be distinguished from an alumina sintered body as a product), and a second heat treatment step A4 of subjecting the alumina sintered body raw material to which the alkaline earth metal compound has been applied to heat treatment. In an example of this production method, the molding step A1 may be omitted when an alumina compact can be prepared in advance, and the molding step A1 and the first heat treatment step A2 may be omitted when an alumina sintered body raw material can be prepared in advance. Further, in order to sufficiently ensure the hardness of the alumina sintered body, this production method preferably does not comprise a step of adding silicon or a compound comprising silicon.

<Molding step A1>

The content of alumina in the alumina powder used in the molding step A1 is preferably 80 mass % or more, more preferably 90 mass % or more, further preferably 95 mass % or more, particularly preferably 99 mass % or more. The alumina powder is preferably purified, for example, by the Bayer process.

Further, the alumina powder is free from silicon except unavoidable impurities. The content of silicon in the alumina powder that is acceptable as unavoidable impurities is 0.7 mass % or less, in terms of $SiO_2$ that is an oxide. From this reason, the content of silicon in the alumina powder is preferably 0.5 mass % or less, further preferably 0.3 mass % or less, in terms of oxide.

The unavoidable impurities herein mean unavoidable impurities contained in starting materials or components inevitably incorporated during the production process.

Further, the median diameter ($d_{50}$) of the alumina powder is preferably 3 μm or less, more preferably 1 μm or less.

Examples of the method for molding the alumina powder include die pressing, cold isostatic pressing, casting, injection molding, and extrusion, and the method can be appropriately selected depending on the conditions such as the properties, shape, size, or the like of the alumina compact to be fabricated, or the production equipment. When the alumina sintered body is used as abrasive grains, extrusion is preferable.

<First Heat Treatment Step A2>

In order to obtain a dense alumina sintered body, the heat treatment temperature for the alumina compact in this step is 1200° C. or more, more preferably 1200 to 1800° C., further preferably 1300 to 1750° C., particularly preferably 1400 to 1700° C. Further, the heat treatment atmosphere may be any one of atmospheric air, inert atmosphere and vacuum, preferably atmospheric air. Any combination of the firing temperature and the firing atmosphere above can be applied. In this step, the temperature within the aforementioned range is retained for 5 to 300 minutes. It is more preferable to maintain the temperature for 10 to 180 minutes, further preferably for 30 to 120 minutes. When the retention time is 5 minutes or more, a dense sintered body is obtained, and when the retention time is 300 minutes or less, the crystal grain size of the alumina crystal grains contained in the inner layer can be maintained to be small.

Examples of the heat treatment method in this step include a method for subjecting the alumina compact put in a container such as a sagger to heat treatment in an electric furnace such as a muffle furnace or a tunnel-type continuous firing furnace, and a method for subjecting the alumina compact directly to heat treatment in a firing apparatus such as a rotary kiln.

The average aspect ratio of alumina crystal grains contained in the alumina sintered body raw material obtained herein is preferably 1.0 to 2.0, more preferably 1.0 to 1.8, further preferably 1.0 to 1.5. A reduction in the average aspect ratio of the alumina sintered body raw material can increase the difference between the average aspect ratio of alumina crystal grains contained in the outer layer of the alumina sintered body, which will be described below, and the average aspect ratio of alumina crystal grains contained in the inner layer.

<Application Step A3>

Examples of the method for applying the alkaline earth metal compound to the surface of the alumina sintered body raw material in the application step A3 include a method for spraying a dispersion or a solution of the alkaline earth metal compound to the alumina sintered body raw material. According to this method, it is easy to control the amount of the alkaline earth metal compound to be applied to the alumina sintered body raw material, and it is easy to make the application amount uniform. The method for applying the alkaline earth metal compound to the surface of the alumina sintered body raw material is not limited thereto and needs only to enable the alkaline earth metal compound to deposit on the surface of the alumina sintered body raw material, as in brush coating, dipping, and the like.

Recrystallization of crystal grains on the surface of the alumina sintered body can rapidly proceed by applying the alkaline earth metal compound to the surface of the alumina sintered body raw material. The recrystallization refers to a phenomenon in which polycrystalline grains incorporate other crystal grains with time, thereby reducing the number of the crystal grains and increasing the grain size. As the recrystallization proceeds, the alumina crystal grains anisotropically grow, and therefore the aspect ratio of the alumina crystal grains increases, as the recrystallization proceeds.

The alkaline earth metal compound applied in the application step A3 is preferably at least one selected from the group consisting of calcium compounds, strontium compounds, and barium compounds.

Examples of the calcium compounds include calcium oxide, calcium fluoride, calcium chloride, calcium chlorate, calcium perchlorate, calcium hypochlorite, calcium bromide, calcium bromate, calcium iodide, calcium iodate, calcium nitrate, calcium nitrite, calcium sulfate, calcium sulfite, calcium thiosulfate, calcium bisulfate, calcium bisulfite, amide calcium sulfate, calcium dithionate, calcium tetrathionate, calcium hydroxide, calcium carbonate, calcium bicarbonate, calcium phosphate, calcium diphosphate, calcium superphosphate, calcium hypophosphate, calcium metaphosphate, calcium hydrogen phosphate, calcium dihydrogen phosphate, calcium dihydrogen diphosphate, calcium phosphide, calcium monophosphide, calcium borate, calcium metaborate, calcium tetrafluoroborate, calcium formate, calcium acetate, calcium propionate, calcium butyrate, calcium laurate, calcium myristate, calcium palmitate, calcium stearate, calcium oleate, calcium malate, calcium hydrogen malate, calcium citrate, calcium hydrogen citrate, calcium benzoate, calcium phthalate, calcium salicylate, calcium oxalate, calcium malonate, calcium succinate, calcium fumarate, calcium maleate, calcium tartrate, calcium bitartrate, calcium hippurate, calcium lactate, calcium gluconate, calcium phosphinate, calcium phosphonate, calcium hydrogen phosphonate, calcium methoxide, calcium ethoxide, calcium phenoxide, calcium hydroxide methoxide, calcium sulfide, calcium benzene sulfonate, calcium amide, calcium imide, and calcium azide.

Examples of the strontium compounds include strontium oxide, strontium fluoride, strontium chloride, strontium chlorate, strontium perchlorate, strontium hypochlorite, strontium bromide, strontium bromate, strontium iodide, strontium iodate, strontium nitrate, strontium nitrite, strontium sulfate, strontium sulfite, strontium thiosulfate, strontium bisulfate, strontium bisulfite, amide strontium sulfate, strontium dithionate, strontium tetrathionate, strontium hydroxide, strontium carbonate, strontium bicarbonate, strontium phosphate, strontium diphosphate, strontium hypophosphite, strontium metaphosphate, strontium hydrogen phosphate, strontium dihydrogen phosphate, strontium dihydrogen diphosphate, strontium phosphide, strontium monophosphide, strontium borate, strontium metaborate, strontium tetrafluoroborate, strontium formate, strontium acetate, strontium propionate, strontium butyrate, strontium laurate, strontium myristate, strontium palmitate, strontium stearate, strontium oleate, strontium malate, strontium hydrogen malate, strontium citrate, strontium hydrogen citrate, strontium benzoate, strontium phthalate, strontium salicylate, strontium oxalate, strontium malonate, strontium succinate, strontium fumarate, strontium maleate, strontium tartrate, strontium bitartrate, strontium hippurate, strontium lactate, strontium gluconate, strontium phosphinate, strontium phosphonate, strontium hydrogen phosphonate, strontium methoxide, strontium ethoxide, strontium phenoxide, strontium hydroxide methoxide, strontium sulfide, strontium benzene sulfonate, strontium amide, strontium imide, and strontium azide.

Examples of the barium compounds include barium oxide, barium fluoride, barium chloride, barium chlorate, barium perchlorate, barium hypochlorite, barium bromide, barium bromate, barium iodide, barium iodate, barium nitrate, barium nitrite, barium sulfate, barium sulfite, barium thiosulfate, barium bisulfate, barium bisulfite, amide barium sulfate, barium dithionate, barium tetrathionate, barium hydroxide, barium carbonate, barium bicarbonate, barium phosphate, barium diphosphate, barium hypophosphite, barium metaphosphate, barium hydrogen phosphate, barium dihydrogen phosphate, barium dihydrogen diphosphate, barium phosphide, barium monophosphide, barium borate, barium metaborate, barium tetrafluoroborate, barium formate, barium acetate, barium propionate, barium butyrate, barium laurate, barium myristate, barium palmitate, barium stearate, barium oleate, barium malate, barium hydrogen malate, barium citrate, barium hydrogen citrate, barium benzoate, barium phthalate, barium salicylate, barium oxalate, barium malonate, barium succinate, barium fumarate, barium maleate, barium tartrate, barium bitartrate, barium hippurate, barium lactate, barium gluconate, barium phosphinate, barium phosphonate, barium hydrogen phosphonate, barium methoxide, barium ethoxide, barium phenoxide, barium hydroxide methoxide, barium sulfide, barium benzene sulfonate, barium amide, barium imide, and barium azide.

Among these, more preferable examples of the alkaline earth metal compound include calcium oxide, calcium chloride, calcium nitrate, calcium sulfate, calcium hydroxide, calcium carbonate, calcium formate, calcium acetate, calcium stearate, calcium lactate, calcium gluconate, strontium oxide, strontium chloride, strontium nitrate, strontium sulfate, strontium hydroxide, strontium carbonate, strontium formate, strontium acetate, strontium stearate, strontium lactate, strontium gluconate, barium oxide, barium chloride, barium nitrate, barium sulfate, barium hydroxide, barium carbonate, barium formate, barium acetate, barium stearate, barium lactate, and barium gluconate. The alkaline earth metal compound may be an anhydride or a hydrate, or a mixture of two or more of these examples. Further, calcium acetate hydrate and barium acetate are more preferable among these compounds.

Examples of a dispersion medium for dispersing or a solvent for dissolving the alkaline earth metal compound include at least one selected from the group consisting of water, formic acid, methanol, ethanol, 1-propanol, 2-propanol, butanol, acetic acid, dimethylsulfoxide, N,N-dimethylformamide, acetonitrile, acetone, tetrahydrofuran, methylene chloride, ethyl acetate, chloroform, diethyl ether, toluene, benzene, and hexane, and water is preferable.

The amount of the alkaline earth metal compound applied per 100 parts by mass of the alumina sintered body raw material in the application step A3 is preferably 0.05 parts by mass or more in terms of oxide. This is because the recrystallization efficiently proceeds on the surface of the alumina sintered body raw material in the second heat treatment step A4, which will be described below, so that the aspect ratio of alumina crystal grains contained in the outer layer of the alumina sintered body that is a product can be sufficiently increased. From the same point of view, the amount of the alkaline earth metal compound applied is more preferably 0.10 parts by mass or more, further preferably 0.20 parts by mass or more. Further, in view of the production cost, the amount of the alkaline earth metal compound applied is preferably 5.0 parts by mass or less, more preferably 4.0 parts by mass or less, further preferably 3.0 parts by mass or less.

<Second Heat Treatment Step A4>

In the second heat treatment step A4, the alumina sintered body raw material to which the alkaline earth metal compound has been applied is subjected to heat treatment at a heat treatment temperature of 1200° C. or more. The heat treatment at a heat treatment temperature of 1200° C. or more enables alumina to be sufficiently recrystallized on the surface of the alumina sintered body raw material. From this reason, the heat treatment temperature is more preferably 1300° C. or more, further preferably 1400° C. or more. Further, the heat treatment temperature in the second heat treatment step A4 is preferably 1800° C. or less. Necking between the alumina sintered bodies is suppressed by setting the heat treatment temperature to 1800° C. or less, so that the alumina sintered body having a desired shape can be obtained. From this reason, the heat treatment temperature is more preferably 1750° C. or less, further preferably 1700° C. or less. Further, the heat treatment atmosphere may be any one of atmospheric air, inert atmosphere and vacuum, preferably atmospheric air. Any combination of the firing temperature and the firing atmosphere above can be applied.

The recrystallization on the surface of the alumina sintered body sufficiently proceeds by setting the retention time of the heat treatment temperature in this step to 5 minutes or more. Further, necking between the alumina sintered bodies can be suppressed by setting the retention time of the heat treatment temperature to 300 minutes or less. From this point of view, the retention time of the heat treatment temperature is more preferably 10 to 180 minutes, further preferably 30 to 120 minutes.

Examples of the heat treatment method in this step include a method for subjecting the alumina sintered body raw material put in a container such as a sagger to heat treatment in an electric furnace such a muffle furnace or a tunnel-type continuous firing furnace, and a method for subjecting the alumina sintered body raw material directly to heat treatment in a firing apparatus such as a rotary kiln.

2. Second Embodiment

FIG. 2 is a flowchart showing an example of a method for producing an alumina sintered body of the second embodiment of the present invention. This production method includes a molding step B1 of fabricating an alumina compact from alumina powder, an application step B2 of applying an alkaline earth metal compound to the surface of the alumina compact obtained by the molding step B1, and a heat treatment step B3 of subjecting the alumina compact to which the alkaline earth metal compound has been applied to heat treatment. In the second embodiment, the unsintered alumina compact is used as an alumina raw material that is subjected to heat treatment in the heat treatment step B3, and therefore there is no need to produce or obtain an alumina sintered body raw material, so that the production cost can be reduced. In an example of the production method, the molding step B1 may be omitted when an alumina compact can be prepared in advance. In an example of the production method, the molding step B1 is the same as the molding step A1, and therefore the application step B2 and the heat treatment step B3 will be described herein. Further, in order to sufficiently ensure the hardness of the alumina sintered body, this production method preferably does not comprise a step of adding silicon or a compound comprising silicon.

<Application Step B2>

Examples of the method for applying the alkaline earth metal compound to the surface of the alumina compact in the application step B2 include a method for spraying a dispersion or a solution of the alkaline earth metal compound to the alumina compact. According to this method, it is easy to control the amount of the alkaline earth metal compound to be applied to the alumina compact, and it is easy to make the application amount uniform. The method for applying the alkaline earth metal compound to the surface of the alumina compact is not limited thereto and needs only to enable the alkaline earth metal compound to deposit on the surface of the alumina compact, as in brush coating, dipping, and the like.

The alkaline earth metal compound applied in the application step B2 is preferably at least one selected from the group consisting of calcium compounds, strontium compounds, and barium compounds. By applying the alkaline earth metal compound to the surface of the alumina compact, crystal growth on the surface can proceed more rapidly than inside. Preferable examples of the calcium compounds, the strontium compounds, and the barium compounds, and a dispersion medium or a solvent to be used are the same as in the application step A3.

In the application step B2, the amount of the alkaline earth metal compound applied per 100 parts by mass of the alumina compact is preferably 0.05 parts by mass or more in terms of oxide. By setting the amount of the alkaline earth metal compound applied per 100 parts by mass of the alumina compact to 0.05 parts by mass or more in terms of oxide, crystal growth of alumina efficiently proceeds on the surface of the alumina compact in the heat treatment step B3, so that the aspect ratio of alumina crystal grains contained in the outer layer of the alumina sintered body that is a product can be sufficiently increased. From the same point of view, the amount of the alkaline earth metal compound applied is more preferably 0.10 parts by mass or more, further preferably 0.20 parts by mass or more. Further, in view of the production cost, the amount of the alkaline earth metal compound applied is preferably 5.0 parts by mass or less, more preferably 4.0 parts by mass or less, further preferably 3.0 parts by mass or less.

<Heat Treatment Step B3>

In the heat treatment step B3, the alumina compact to which the alkaline earth metal compound has been applied is subjected to heat treatment at a heat treatment temperature of 1200° C. or more. The heat treatment at a heat treatment temperature of 1200° C. or more can allow alumina crystal grains to sufficiently grow on the surface of the alumina. From this reason, the heat treatment temperature is more preferably 1300° C. or more, further preferably 1400° C. or more. Further, the heat treatment temperature in the heat treatment step B3 is preferably 1800° C. or less. Necking between the alumina sintered bodies is suppressed by setting the heat treatment temperature in the heat treatment step B3 to 1800° C. or less, so that the alumina sintered body having a desired shape can be obtained. From this reason, the heat treatment temperature is more preferably 1750° C. or less, further preferably 1700° C. or less. Further, the heat treatment atmosphere may be any one of atmospheric air, inert atmosphere and vacuum, preferably atmospheric air. Any combination of the firing temperature and the firing atmosphere above can be applied. Specific examples of the heat treatment method in this step are as described above in the second heat treatment step A4.

The crystal growth on the surface of alumina sufficiently proceeds by setting the retention time of the heat treatment temperature in this step to 5 minutes or more. Further, necking between the alumina sintered bodies can be suppressed by setting the retention time of the heat treatment temperature to 300 minutes or less. From this point of view, the retention time of the heat treatment temperature is preferably 10 to 180 minutes, more preferably 30 to 120 minutes.

3. Product of Alumina Sintered Body

In an alumina sintered body produced by the production method of such an embodiment, the size and the shape of alumina crystal grains contained are different between in the vicinity of the surface (which will be hereinafter referred to as "outer layer") and in the inside (which will be hereinafter referred to as "inner layer"). Since recrystallization or growth of the crystal grains in the outer layer is accelerated by applying the alkaline earth metal compound, the size per alumina crystal grain contained in the outer layer (such as the number-average grain size, and the same applies to the following) is larger than the size per alumina crystal grain contained in the inner layer. Further, the aspect ratio of alumina crystal grains contained in the outer layer is larger than the aspect ratio of alumina crystal grains contained in the inner layer.

When the size and the aspect ratio of crystal grains constituting the alumina sintered body are small, the alumina sintered body has high strength and high hardness. Meanwhile, when the size and the aspect ratio of crystal grains constituting the alumina sintered body are large, the alumina sintered body has high toughness.

Accordingly, the alumina sintered body produced by the production method of any of the embodiments has high toughness in the outer layer, that is, in the vicinity of the surface and has high strength and high hardness in the inner layer, that is, inside the sintered body.

FIG. 5 and FIG. 6 are SEM images of the surfaces of the alumina sintered bodies fabricated in Example 2 and Example 4, which will be described below. On the surfaces of the alumina sintered bodies produced by the production methods of the embodiments, there is no fusion between alumina crystal grains or there is fusion only between some alumina grains, not between all alumina grains, as shown in FIG. 5 and FIG. 6. Further, there are sharp asperities that are considered to be derived from the outlines of the alumina crystal grains on the surfaces of the alumina sintered bodies produced by the production methods of the embodiments. Further, hollows are formed between the crystal grains also in the parts of the outer layers other than the surfaces of the alumina sintered bodies. Therefore, it is considered that, even if the surfaces of the alumina sintered bodies have been worn out, asperities due to the hollows between the crystal grains appear on newly appearing surfaces, so that the roughness and the surface shape with sharp asperities of the surfaces of the alumina sintered bodies are maintained, as long as the outer layers remain.

4. Abrasive Grains Using Alumina Sintered Body

In the case of using the alumina sintered body as abrasive grains, the surface that directly contacts workpieces separates from the sintered body upon breakage to be lost and worn out. Further, when cracks occur on the surface of the alumina sintered body, the surface is lost as a large fragment, thus accelerating the wear rate. Therefore, when the surface of the alumina sintered body has high toughness, the wear resistance is improved. Further, the inside of the alumina sintered body needs to receive the force applied to the surface and efficiently transmit the force to the surface that contacts workpieces. Further, plastic deformation inside the alumina sintered body affects the performance of the alumina sintered body. Therefore, the inside of the alumina sintered body preferably has high hardness and high strength.

In the alumina sintered bodies produced by the production methods of the embodiments, the average aspect ratio of alumina crystal grains contained in the outer layer is large, and therefore the outer layer has high toughness and excellent wear resistance. Further, the average aspect ratio of alumina crystal grains contained in the inner layer is small, and therefore the inner layer has high strength and high hardness. Therefore, the inner layer not only can efficiently transmit the force applied to the alumina sintered body to the outer layer that contacts workpieces but also can suppress a reduction in performance due to plastic deformation of the alumina sintered body. Therefore, the alumina sintered bodies produced by the production methods of the embodiments are suitable, for example, for applications of grinding tools, applications of grinding abrasive materials such as abrasive materials, grinding wheels, and abrasive cloth papers, and are particularly suitable for applications as abrasive grains of grinding wheels for heavy grinding in the iron and steel industry. Heavy grinding is a grinding method to remove surface defects of steel billets (such as slabs, blooms, and billets) and has a feature that the grinding load and the grinding speed are exceptionally high. The load applied to abrasive grains is 980 N or more and may be over 9.8 kN, depending on the circumstances. Abrasive grains used with such a high load applied are called heavy-grinding abrasive grains.

Further, it is considered that the alumina sintered body produced by the production methods of any of the embodiments has sharp asperities on the surface, as described above, and even if the surface has been worn out, the roughness and the shape having sharp asperities of the surface of the alumina sintered body are maintained, as long as the outer layer remains. Therefore, it is considered that, in the case of using the alumina sintered body as a grinding wheel, it is possible to efficiently grind workpieces, until the inner layer is exposed.

The shape of the abrasive grains is not specifically limited, but when it is a circular cylindrical shape, molding is easy, and a grinding wheel having more excellent grinding performance is obtained.

In the case of applying the method for producing an alumina sintered body of any of the embodiments to a method for producing an alumina sintered body as abrasive grains, an extrusion granulation method is preferably used as a method for producing an alumina compact. The extrusion granulation method is a granulation method to obtain pellets by adding a liquid to raw material powder, followed by kneading, to fabricate a cake of raw material powder and extruding the cake of raw material powder from dies having a lot of open holes. In the extrusion granulation method, a screw extrusion granulator is, for example, used. In this granulation method, alumina pellets of a circular cylindrical shape can be obtained. The alumina pellets obtained may be used as an alumina compact as they are, may be used as an alumina compact after equalizing the lengths of the alumina pellets using a disintegrating granulator or the like, or may be used as an alumina compact after further making the alumina pellets into a spherical shape using a spherical granulator or the like. The size of the alumina compact is appropriately selected based on the target grain size of abrasive grains. Examples of the grain size of abrasive grains include a grain size defined in JIS R6111 (artificial abrasive material). When advanced preparation is possible, such as when an alumina compact having a desired shape as a grinding wheel can be obtained, the step of fabricating the alumina compact may be omitted.

5. Grinding Wheel Using Alumina Sintered Body

A grinding wheel having a high grinding ratio can be obtained by fixing a layer of abrasive grains using the alumina sintered body produced by the production method of any of the embodiments to the working surface. Examples of the method for fixing the abrasive grains to the working surface of the grinding wheel include methods using resin bonds, vitrified bonds, metal bonds, and electrodeposition. Further, examples of materials for a base metal include steels, stainless steel alloys, and aluminum alloys, and the method for fixing abrasive grains is selected depending on the use. The alumina sintered body of the embodiment has good resin affinity, and thus a grinding wheel in which abrasive grains hardly fall off even in heavy grinding can be produced by fixing it to the grinding wheel using a resin bond containing a phenolic resin as a main component.

EXAMPLES

Hereinafter, the present invention will be described more specifically by way of Examples, but the present invention is not limited to the following Examples.

[1. Fabrication of Alumina Sintered Body (Abrasive Grains)]

Alumina sintered bodies of Examples 1 to 6 and Comparative Examples 1 to 3 were fabricated as follows. The methods for producing an alumina sintered body, alumina raw materials, alkaline earth metal compounds applied to the alumina raw materials, and the application amounts of the alkaline earth metals in terms of oxides in these Examples and Comparative Examples were as shown in Table 1. In the following Examples, alumina sintered body raw materials and alumina compacts were available, and thus the molding step A1 and the first heat treatment step A2 in the first embodiment, and the molding step B1 in the second embodiment were not performed (as described above, these steps may be omitted). Further, since Comparative Examples 1 to 3 did not correspond to any of the embodiments, the symbol "-" was input in the column of Production method.

TABLE 1

| | Production method | Alumina raw material | Alkaline earth metal compound | Converted oxide | Alkaline earth metal compound applied (in terms of oxide)/Parts by mass (100 parts by mass of alumina raw material) |
|---|---|---|---|---|---|
| Example 1 | First embodiment | Sintered body | Calcium acetate | CaO | 0.32 |
| Example 2 | First embodiment | Sintered body | Calcium acetate | CaO | 0.63 |
| Example 3 | First embodiment | Sintered body | Calcium acetate | CaO | 0.95 |
| Example 4 | First embodiment | Sintered body | Barium acetate | BaO | 1.19 |
| Example 5 | First embodiment | Sintered body | Barium acetate | BaO | 1.77 |
| Example 6 | Second embodiment | Unsintered | Calcium acetate | CaO | 0.32 |
| Comparative Example 1 | — | Sintered body | — | — | — |
| Comparative Example 2 | — | Sintered body | — | — | — |
| Comparative Example 3 | — | Sintered body | Magnesium acetate | MgO | 0.38 |

Example 1

An alumina sintered body raw material (product number SR-1, manufactured by Showa Denko K.K.) of a circular cylindrical shape with a grain size of F12 (JIS R6001) was prepared. The alumina sintered body raw material was obtained by extrusion of alumina raw material powder ($Al_2O_3$: 99.2 mass %, $SiO_2$: 0.2 mass % as unavoidable impurities, $Fe_2O_3$: 0.1 mass %, and the remainder was minor components) into a circular cylindrical shape with a diameter of 1.8 mm and an average length (based on the number) of 4.0 mm by the extrusion granulation method, followed by firing.

1.0 g of calcium acetate hydrate (manufactured by Wako Pure Chemical Industries, Ltd.) was dissolved in 10.0 mL of distilled water to fabricate a calcium acetate aqueous solution. 100.0 g of the alumina sintered body raw material was weighed into an evaporating dish. All the calcium acetate aqueous solution, was uniformly sprayed to the surface of the alumina sintered body raw material, and thereby calcium acetate was applied to the surface of the alumina sintered body raw material. The proportion of the amount of calcium obtained by converting the mass of calcium acetate applied in terms of CaO per 100 parts by mass of the alumina sintered body raw material before the application of calcium acetate was 0.32 parts by mass.

The alumina sintered body raw material to which calcium acetate was applied was put into an electric furnace, in which the temperature was raised from room temperature to 1700° C. over 200 minutes, and the heat treatment temperature at 1700° C. was retained for 1 hour, to fabricate an alumina sintered body. The heat treatment atmosphere was atmospheric air.

Example 2

An alumina sintered body was fabricated in the same manner as in Example 1 except that 2.0 g of calcium acetate hydrate (manufactured by Wako Pure Chemical Industries, Ltd.) was dissolved in 10.0 mL of distilled water to fabricate a calcium acetate aqueous solution. The proportion of the amount of calcium obtained by converting the mass of calcium acetate applied in terms of CaO per 100 parts by mass of the alumina sintered body raw material before the application of calcium acetate was 0.63 parts by mass.

Example 3

An alumina sintered body was fabricated in the same manner as in Example 1 except that 3.0 g of calcium acetate hydrate (manufactured by Wako Pure Chemical Industries, Ltd.) was dissolved in 10.0 mL of distilled water to fabricate a calcium acetate aqueous solution. The proportion of the amount of calcium obtained by converting the mass of calcium acetate applied in terms of CaO per 100 parts by mass of the alumina sintered body raw material before the application of calcium acetate was 0.95 parts by mass.

Example 4

An alumina sintered body was fabricated in the same manner as in Example 1 except that a barium acetate aqueous solution fabricated by dissolving 2.0 g of barium acetate (manufactured by Wako Pure Chemical Industries, Ltd.) in 10.0 mL of distilled water was used instead of the calcium acetate aqueous solution. The proportion of the amount of barium obtained by converting the mass of barium acetate applied in terms of BaO per 100 parts by mass of the alumina sintered body raw material before the application of barium acetate was 1.19 parts by mass.

Example 5

An alumina sintered body was fabricated in the same manner as in Example 1 except that a barium acetate aqueous solution fabricated by dissolving 3.0 g of barium acetate (manufactured by Wako Pure Chemical Industries, Ltd.) in 10.0 mL of distilled water was used instead of the calcium acetate aqueous solution. The proportion of the amount of barium obtained by converting the mass of barium acetate applied in terms of BaO per 100 parts by mass of the alumina sintered body raw material before the application of barium acetate was 1.77 parts by mass.

Example 6

1.0 g of calcium acetate hydrate (manufactured by Wako Pure Chemical Industries, Ltd.) was dissolved in 10.0 mL of distilled water to fabricate a calcium acetate aqueous solution. Thereafter, 100.0 g of alumina pellets before sintering (that is, unsintered alumina compact) of the alumina sintered body (product number SR-1, manufactured by Showa Denko K.K.) used in Example 1 was weighed into an evaporating dish. All the calcium acetate aqueous solution was uniformly sprayed to the surfaces of the alumina pellets. The proportion of the amount of calcium obtained by converting the mass of calcium acetate applied in terms of CaO per 100 parts by mass of the alumina pellets before the application of calcium acetate was 0.32 parts by mass.

The alumina pellets onto which calcium acetate deposited were put into an electric furnace, in which the temperature was raised from room temperature to 1700° C. over 200 minutes. Then, the alumina pellets were fired at a temperature of 1700° C. for 1 hour, to fabricate an alumina sintered body of Example 6. The heat treatment atmosphere was atmospheric air.

Comparative Example 1

An alumina sintered body of Comparative Example 1 was fabricated in the same manner as in Example 1 except that the alkaline earth metal compound was not applied.

Comparative Example 2

An alumina sintered body raw material (product number SR-1, manufactured by Showa Denko K.K.) of a circular cylindrical shape with a grain size of F12 (JIS R6001), that is, the alumina sintered body raw material used in Example 1 was used as it was as an alumina sintered body of Comparative Example 2. That is, the difference from Example 1 was that the alumina sintered body was not subjected to heat treatment in Comparative Example 2.

Comparative Example 3

An alumina sintered body was fabricated in the same manner as in Example 1 except that a magnesium acetate aqueous solution fabricated by dissolving 2.0 g of magnesium acetate (manufactured by Wako Pure Chemical Industries, Ltd.) in 10.0 mL of distilled water was used instead of the calcium acetate aqueous solution. The proportion of the amount of magnesium obtained by converting the mass of magnesium acetate applied in terms of MgO per 100 parts by mass of the alumina sintered body raw material before the application of magnesium acetate was 0.38 parts by mass.

[2. Evaluation of Alumina Sintered Body]

<Observation of Surface of Alumina Sintered Body>

FIG. 5 is a scanning electron microscope (SEM) image of the surface of the alumina sintered body of Example 2 (1000 times), FIG. 6 is a scanning electron microscope (SEM) image of the surface of the alumina sintered body of Example 4 (3000 times), and FIG. 7 is a scanning electron microscope (SEM) image of the surface of the alumina sintered body of Comparative Example 1 (3000 times). On the surfaces of the alumina sintered bodies produced in Examples 2 and 4, there is no fusion between alumina crystal grains or fusion is a part of the alumina crystal grains, as seen from FIG. 5 and FIG. 6. Further, it is understood that there are sharp asperities that are considered to be derived from the outlines of the alumina crystal grains on the surfaces of the alumina sintered bodies produced by the production methods of the embodiments. Further, it is understood that hollows are formed between the crystal grains also in the parts of the outer layers other than the surfaces of the alumina sintered bodies. Meanwhile, in FIG. 7, such sharp asperities as captured in FIG. 5 and FIG. 6 cannot be observed. Further, it is understood that the number of hollows between adjacent crystal grains is also very small as compared with those in FIG. 5 and FIG. 6.

<Observation of Cross Section of Alumina Sintered Body and Measurement of Thickness of Outer Layer>

Cross sections including the surfaces of the alumina sintered bodies of Examples 1 and 4 were observed using a scanning electron microscope (SEM) (model name "JSM-6510V" manufactured by JEOL Ltd). FIG. 3 is a scanning electron microscope (SEM) image of the cross section of the alumina sintered body of Example 1, and FIG. 4 is a scanning electron microscope (SEM) image of the cross section of the alumina sintered body of Example 4 (both 500 times). Upon observing these SEM images, it is understood that an alumina sintered body having two layers on the internal side and on the surface side between which the aspect ratios of alumina crystal grains contained are different has been obtained. For the alumina sintered bodies according to Examples 1 to 6, the depth of the portions on the surfaces of the alumina sintered bodies, formed by alumina crystal grains having a larger aspect ratio than inside, from the surfaces was measured, and such a range was taken as the thickness of the outer layers. Table 2 shows the measurement results of the thickness of the outer layers of Examples 1 to 6. For Comparative Examples 1 to 3, no outer layers were formed, and thus the thickness of the outer layers could not be measured.

TABLE 2

| | Aspect ratio of alumina crystal grains | | Outer layer | | Mass on sieve/g | Vickers hardness/Hv |
|---|---|---|---|---|---|---|
| | Outer layer | Inner layer | Thickness/μm | Coverage/% | | |
| Example 1 | 3.3 | 1.3 | 34 | 33 | 8.59 | 17.4 |
| Example 2 | 3.4 | 1.3 | 20 | 58 | 8.65 | 18.2 |
| Example 3 | 4.0 | 1.3 | 59 | 51 | 8.70 | 17.2 |
| Example 4 | 3.0 | 1.3 | 27 | 97 | 8.83 | 18.4 |
| Example 5 | 3.1 | 1.3 | 30 | 98 | 8.87 | 17.8 |
| Example 6 | 3.8 | 1.3 | 13 | 58 | 8.81 | 17.4 |
| Comparative Example 1 | — | 1.3 | — | — | 7.81 | 17.7 |
| Comparative Example 2 | — | 1.3 | — | — | 7.87 | 17.4 |
| Comparative Example 3 | — | 1.3 | — | — | 7.85 | 17.6 |

<Average Aspect Ratio of Alumina Crystal Grains Contained in Outer Layer of Alumina Sintered Body>

For the surfaces of the alumina sintered bodies of Examples 1 to 6 and Comparative Examples 1 to 3, 100 crystal grains were selected at random on the surfaces of the alumina sintered bodies observed by SEM, as shown in FIG. 5 to 7, then the lengths of the short sides and the long sides of the selected alumina crystal grains were measured, to calculate aspect ratios, and the average values of the aspect ratios of the 100 alumina crystal grains were calculated based on the number, to be taken as the average aspect ratios of alumina crystal grains contained in the outer layers. Table 2 shows the measurement results of the average aspect ratios of alumina crystal grains contained in the outer layers in Examples 1 to 6 and Comparative Examples 1 to 3. For Comparative Examples 1 to 3, the measurement results are shown by the symbol "-" since no outer layers were formed in these Comparative Examples, as described above.

<Average Aspect Ratio of Alumina Crystal Grains Contained in Inner Layer of Alumina Sintered Body>

Thermally etched images of the cross sections of the inner layers of the alumina sintered bodies of Examples 1 to 6 and Comparative Examples 1 to 3 were observed using the aforementioned SEM. FIG. 8 is a thermally etched image (3500 times) of the inner layer of the alumina sintered body of Example 2 observed by SEM. Further, FIG. 9 is a thermally etched image (3500 times) of the inner layer of the alumina sintered body of Example 2 observed by SEM. These two were shown as examples of the thermally etched images, but the average aspect ratios of alumina crystal grains contained in the inner layers were measured based on these images in all of Examples 1 to 6 and Comparative Examples 1 to 3.

Using an image analysis software (software name "MacView ver.4" manufactured by Mountech Co., Ltd.), 450 crystal grains were selected at random from the thermally etched images at a magnification of 3500 times of the inner layers of the alumina sintered bodies, then the lengths of the short sides and the long sides of the selected crystal grains were measured, to calculate aspect ratios, and the average values of the aspect ratios of the 450 crystal grains were calculated based on the number, to be taken as the average aspect ratios of alumina crystal grains contained in the inner layers. Table 2 shows the measurement results of the average aspect ratios of alumina crystal grains contained in the inner layers in Examples 1 to 6 and Comparative Examples 1 to 3.

<Coverage of Outer Layer Based on Inner Layer>

The surfaces of the alumina sintered bodies of Examples 1 to 6 were observed using a scanning electron microscope (model name "JSM-6510V" manufactured by JEOL Ltd.), to measure the area fraction of alumina crystal grains in the outer layers on the surfaces of the alumina sintered bodies of Examples 1 to 6.

As a specific measurement method, images of the surfaces of the alumina sintered bodies magnified by 3000 times, for example, as shown in FIG. 6 were first obtained for 20 visual fields selected at random. Thereafter, the fraction of crystal grains with an aspect ratio of larger than 2.0 in the screen was determined in each visual field, and the average values of the fractions in the 20 visual fields were calculated, to be taken as the area fractions of alumina crystal grains in the outer layers on the surfaces of the alumina sintered bodies. Then, Table 2 shows the area fractions as the coverages (%) of the outer layers based on the inner layers in the alumina sintered bodies of Examples 1 to 6. In Table 2, the measurement results for Comparative Examples 1 to 3 are shown by the symbol "-" since no outer layers were formed in these Comparative Examples, as described above.

<Evaluation of Wear Resistance>

The wear resistance of the alumina sintered bodies fabricated in Examples 1 to 6 and Comparative Examples 1 to 3 was evaluated regarding them as having a circular cylindrical shape with a grain size of F12 defined in JIS R6001-1.

First, 100 g of a sintered body was sieved using a rotating and tapping tester together with a F12 test sieve defined in JIS R6001-1 (which will be hereinafter referred to as "F12 sieve") for 10 minutes, and 10.5 g of the sintered body remaining on the 3rd stage of the sieve was used as a measurement sample.

10.5 g of the measurement sample was put into a steel ball mill container (with 3 lifters) with an inner diameter of 115×110 mm in which 1500 g of chromium steel balls with a diameter of 20 mm had been put. The ball mill was uniaxially rotated at a rotational speed of 95 times/minute for 5 minutes, to obtain a ground sample.

The ground sample was sieved using the F12 sieve for 5 minutes, and the mass of the ground sample remaining on the 1st to 4th stage of the sieve (mass on the sieve) was taken as x (g). In this evaluation, a larger value of the mass on the sieve indicates that the wear resistance of the sample is higher. Table 2 shows the evaluation results.

It turned out that the samples of Examples 1 to 6 had larger values of the mass on the sieve than the samples of Comparative Examples 1 to 3, thus having excellent wear resistance.

<Vickers Hardness>

Using model name "MVK-VL, Hardness Tester" manufactured by Akashi Corporation as a device, the measurement was performed under conditions of a load of 0.98 N and an injection time of an indenter of 10 seconds, and the average value of the measured values at 15 points was taken as a micro-Vickers hardness. Table 2 shows the measurement results. It was seen from Table 2 that the alumina sintered bodies of Examples 1 to 6 had an equivalent hardness to the alumina sintered bodies of Comparative Examples 1 to 3.

<Evaluation of Resin Affinity>

Resin formed articles containing the alumina sintered bodies according to Examples 2 and 4 and Comparative Example 2 were fabricated, and the 3-point bending strength of the resin formed articles fabricated was measured, to evaluate the resin affinity of the alumina sintered bodies.

The method for fabricating the resin formed articles used for the evaluation will be described. First, 0.0097 g of XIAMETER® OF-86020 SILANE (Dow Corning Toray Co., Ltd.) was put into 10 g of water, followed by stirring using a magnetic stirrer for 5 minutes for hydrolysis, to fabricate a silane coupling agent aqueous solution. 500 g of each alumina sintered body fabricated in Examples 2 and 4 and Comparative Example 2 was weighed out, and a silane coupling agent aqueous solution was added to each, followed by mixing within a zipper bag until the surface of the alumina sintered body was uniformly wet. Thereafter, the alumina sintered body was dried at 80° C. for 10 hours, to fabricate a silane coupling-treated alumina sintered body.

Thereafter, 61.5 g of the silane coupling-treated alumina sintered body, 15.5 g of cryolite (manufactured by KANTO CHEMICAL CO., INC.), and 24.0 g of iron sulfide (manufactured by Hosoi Chemical Industry Co., Ltd.) were put into a 200-ml disposable cup (manufactured by AS ONE Corporation), followed by mixing using MAZERUSTAR® (KK-400W, manufactured by KURABO INDUSTRIES LTD.) with the revolution speed set to 4, the rotation speed set to 9, and the operation time set to 60 seconds. Thereafter, 8.0 g of SHONOL® BRL-2534 was added thereto, followed by uniform mixing twice using MAZERUSTAR under conditions of a revolution speed of 4, a rotation speed of 9, and an operation time of 60 seconds, and thereafter 14.0 g of SHONOL® BRP-8152 was added thereto, followed by uniform mixing using MAZERUSTAR under conditions of a revolution speed of 4, a rotation speed of 9, and an operation time of 30 seconds, to fabricate an alumina sintered body mixture (which will be hereinafter referred to as "mixture").

This mixture was put into a die with a width of 26 mm, a length of 150 mm, and a thickness of 50 mm, as product dimensions, and was subjected to hot pressing using a hydraulic forming machine (manufactured by Oji Machine Co., Ltd.) under conditions of a surface pressure of 12.6 GPa, 150° C., and 15 minutes, to fabricate a formed article. The formed article obtained was put into a dryer (model THK33P, manufactured by KATO Inc.), in which the temperature was raised to 120° C. over 8 hours, retained at 120° C. for 4 hours, thereafter raised to 180° C. over 5 hours, retained at 180° C. for 8 hours, and decreased to 60° C. over 11 hours. The product obtained by the aforementioned steps was used as a resin formed article for evaluating the resin affinity.

The method for measuring the 3-point bending strength of the resin formed article will be described. Using Autograph® (AGS-J, manufactured by SHIMADZU CORPORATION) as a measuring device, the measurement was performed under conditions of the distance between external fulcrums L=50 mm, a radius of an indenter of 5 mm, and a test speed of 5 mm/min.

The 3-point bending strength of the resin formed article was calculated by the following formula.

$$\text{(3-point bending strength (MPa))} = 3 \times P \times L / (2 \times w \times t^2)$$

P: Maximum load (N) measured before breakage of resin formed article
L: Distance between external fulcrums (mm) (=50 mm)
w: Width (mm) of resin formed article
t: Thickness (mm) of resin formed article The width (w) and the thickness (t) of the resin formed article were measured using a slide caliper.

Table 3 shows the values determined as the arithmetic average of the measured values obtained with the number of samples n=10 in each of the Examples and the Comparative Example. A larger value of the 3-point bending strength of the resin formed article indicates a better resin affinity of the alumina sintered body, where it is considered that shedding of abrasive grains from the grinding wheel hardly occurs during grinding.

TABLE 3

| | 3-point bending strength/MPa |
|---|---|
| Example 2 | 438 |
| Example 4 | 456 |
| Comparative Example 2 | 356 |

[3. Effects of Examples]

As seen from Table 2, the alumina sintered bodies of Examples 1 to 6 have excellent wear resistance as compared with the alumina sintered bodies of Comparative Examples 1 to 3. Further, it is seen that the alumina sintered bodies of Examples 1 to 6 have an equivalent hardness to the alumina sintered bodies of Comparative Examples 1 to 3. Comparative Example 2 is a commercially available alumina sintered body and has high hardness that is originally possessed by alumina sintered bodies. That is, the alumina sintered bodies according to Examples 1 to 6 have excellent wear resistance while maintaining high hardness that is originally possessed by alumina sintered bodies.

Accordingly, it was found that an alumina sintered body obtained by a production method comprising a step of applying an alkaline earth metal compound that is at least one selected from the group consisting of calcium, strontium, and barium onto the surface of an alumina raw material comprising an unsintered alumina compact or an alumina sintered body, and a step of subjecting the alumina raw material to which the alkaline earth metal compound has been applied to heat treatment at a temperature of 1200° C. or more for 5 minutes or more and 300 minutes or less has high hardness and excellent wear resistance.

Further, as described above with reference to FIG. 5 and FIG. 6, the alumina sintered bodies produced by the aforementioned production method have sharp asperities on the surfaces and have hollows formed between crystal grains also in the parts of the outer layers other than the surfaces of the alumina sintered bodies. Therefore, it is considered that, even if the surfaces of the alumina sintered bodies have been worn out, asperities due to the hollows between crystal grains appear on newly appearing surfaces, so that the roughness and the surface shape with sharp asperities of the surfaces of the alumina sintered bodies are maintained, as long as the outer layers remain. Therefore, it is considered that, when used as grinding wheels, these alumina sintered bodies can grind workpieces efficiently until the inner layers are exposed.

Further, it was also found from Table 3 that such an alumina sintered body had good resin affinity.

The invention claimed is:

1. A method for producing an alumina sintered body, comprising:
   a step of applying an alkaline earth metal compound which is at least one selected from the group consisting of calcium compounds, strontium compounds, and barium compounds onto a surface of an alumina raw material comprising an alumina sintered body; and
   a step of subjecting the alumina raw material to which the alkaline earth metal compound has been applied to heat treatment at a temperature of 1200° C. or more for 5 minutes or more and 300 minutes or less,
   wherein the alumina raw material is an alumina sintered body obtained by molding alumina powder with a median diameter ($d_{50}$) of 3 μm or less, followed by heat treatment at a heat treatment temperature of 1200° C. or more.

2. The method for producing an alumina sintered body according to claim 1, wherein the alkaline earth metal compound is applied to the alumina raw material as a solution or a dispersion comprising the alkaline earth metal compound.

3. The method for producing an alumina sintered body according to claim 1, wherein the alkaline earth metal compound is applied in an amount of 0.05 parts by mass or more and 5.0 parts by mass or less, in terms of oxide, per 100 parts by mass of the alumina raw material.

4. The method for producing an alumina sintered body according to claim 1, wherein the heat treatment is performed at 1800° C. or less.

5. The method for producing an alumina sintered body according to claim 1, wherein the alumina raw material is free from silicon except unavoidable impurities, and the method does not comprise a step of adding silicon or a compound comprising silicon.

* * * * *